(12) United States Patent
Lara et al.

(10) Patent No.: US 6,538,228 B2
(45) Date of Patent: Mar. 25, 2003

(54) METHOD AND DEVICE FOR WELDING

(75) Inventors: Alejandro Sanz Lara, Gemona del Friuli (IT); Alfredo Poloni, Fogliano Redipuglia (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 9 days.

(21) Appl. No.: 09/792,490

(22) Filed: Feb. 23, 2001

(65) Prior Publication Data
US 2001/0017290 A1 Aug. 30, 2001

(30) Foreign Application Priority Data
Feb. 24, 2000 (IT) .......................... MI00A0340

(51) Int. Cl.$^7$ .............................................. B23K 11/04
(52) U.S. Cl. ....................... 219/104; 219/102; 228/5.7
(58) Field of Search ........................ 219/101, 102, 219/103, 104, 161; 228/5.7, 13

(56) References Cited

U.S. PATENT DOCUMENTS

| | | | | |
|---|---|---|---|---|
| 2,120,316 A | * | 6/1938 | Stone | 228/5.7 |
| 2,422,787 A | * | 6/1947 | Klinke | 219/101 |
| 3,059,096 A | * | 10/1962 | Butler | 219/101 |
| 4,294,394 A | * | 10/1981 | Iida et al. | 228/158 |
| 5,219,114 A | * | 6/1993 | Kajiwara et al. | 228/158 |
| 5,774,973 A | * | 7/1998 | Aoyama et al. | 29/526.2 |
| 5,931,370 A | * | 8/1999 | Poloni et al. | 228/158 |

FOREIGN PATENT DOCUMENTS

EP 0 925 852 A2 * 6/1999 ........... B21B/15/00

* cited by examiner

Primary Examiner—M. Alexandra Elve
Assistant Examiner—Kevin P. Kerns
(74) Attorney, Agent, or Firm—Abelman, Frayne & Schwab

(57) ABSTRACT

A welding device for butt welding of bars as well as blooms, slabs, or billets produced by continuous casting, includes a roller conveyor for simultaneous conveying of at least two bars along a rolling line, jaws for gripping the bars, and electric power supplies which are set in contact with the surfaces of the two bars for carrying out a welding operation. The electric power supplies are provided with respective positioning and actuating devices controlled to actuate them independently from one another during setting in contact and detachment of the bars.

20 Claims, 2 Drawing Sheets

FIG. 3
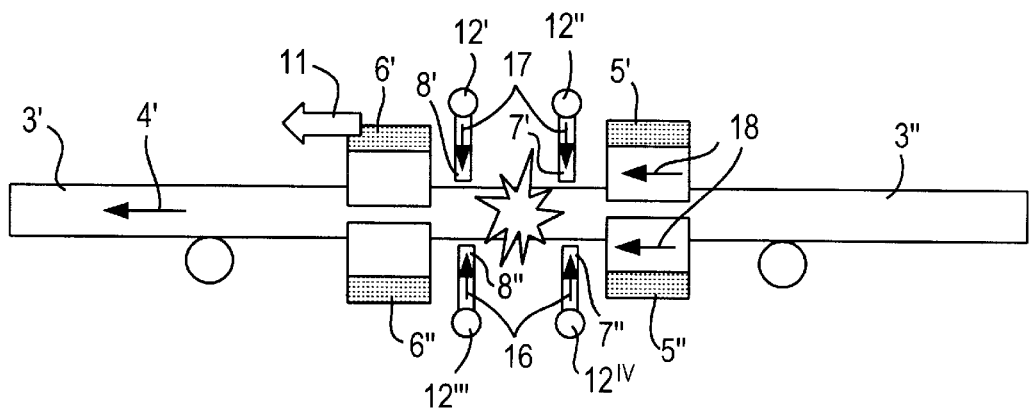
FIG. 4
FIG. 5
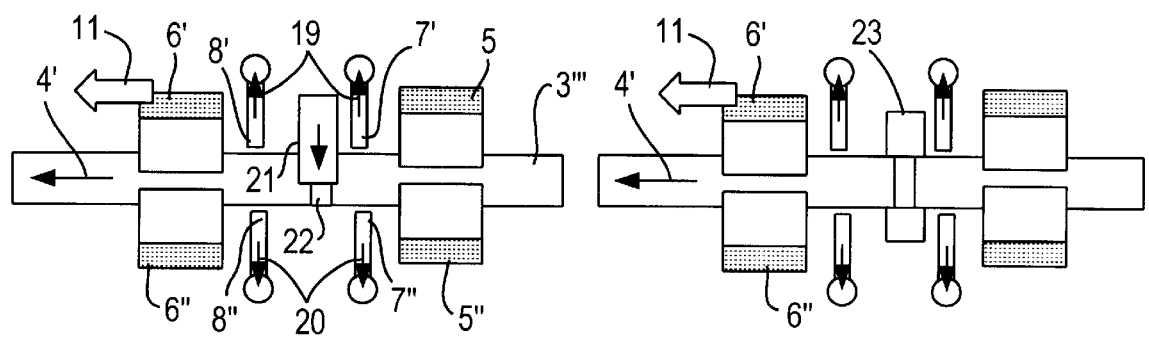
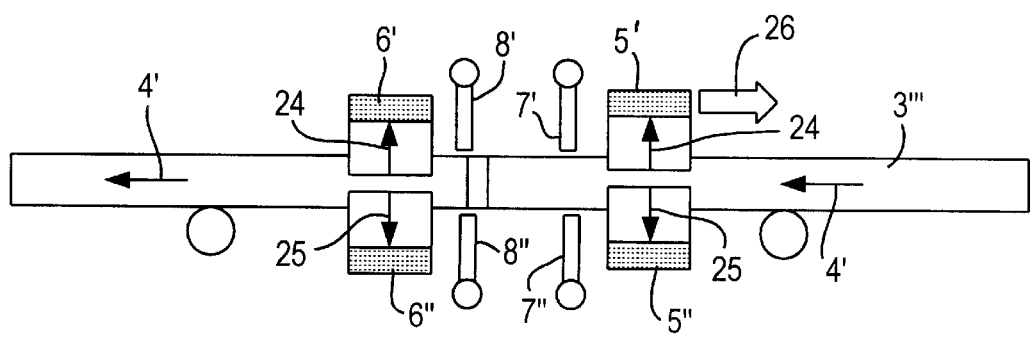
FIG. 6

METHOD AND DEVICE FOR WELDING

SCOPE OF INVENTION

The present invention refers to a method for the butt welding of products coming from the continuous casting of molten materials, and to the corresponding embodiment device, in particular usable in continuous-casting plants for the welding of bars, billets, blooms, slabs and the like.

STATE OF THE ART

With the continuous-casting technique, metallic elements are produced of a basically elongated shape having sections and length of the type referred to above. The length of these products coming from continuous casting varies and it is sometimes necessary to produce elements of greater length by joining a number of elements together by butt welding.

In the current art, welding methods are known which envisage the welding of the rear end of a cast element already set on the rolling line with the front end of another element coming from the casting device or else coming from a storage area. The aim of such welding methods is to gain time and accelerate production, which represents a very important factor for achieving high productivity of the casting line.

In addition to devices for butt welding, various devices for carrying out further processing or operations aimed at improving the quality of the finished product are generally integrated in the casting and rolling chains. Among such devices are cutting tools installed generally upstream of the welding device, for cutting the bars so as to make the surfaces of the ends plan and regular for better contact between the two elements to be welded. Then there are scaling tools, also set generally upstream of the welding device, for cleaning the surfaces of the bars prior to the rolling operation.

Downstream of the welding device, there are trimming tools for eliminating the surface irregularities produced by the welding operation. Other types of cutting tools or abrasive tools may be added according to the requirements.

A casting and rolling chain of this type is known from the Italian patent application UD96A000178, filed in the name of the present Applicant. The welding device, inserted in this casting chain, has two welding jaws which combine in a single element the functions of gripping, positioning and alignment of the cast products, as well as electric power supply functions for supplying the current needed for carrying out the operation of butt welding.

These known types of welding devices present various drawbacks which render their use problematical and make it necessary to carry out complex operations of preparation and finishing on the cast products, both before and after welding, in the phase prior to entry into the rolling mill.

In the welding device referred to, the gripping jaws, in addition to having a rather large surface of contact with the cast product, remain in contact with the surface of the bars, or of the other cast products mentioned above, for a relatively long time so as to complete the welding operation. From the contact between the jaws, which have a temperature lower than the temperature of the bars, and the surfaces of the latter, which are, instead, at a substantially higher temperature, there is produced, on the said bars, local cooling of surfaces of considerable dimensions, which may extend also rather deeply into the bar, generally referred to as "black patches".

In known welding devices of the type described above, the gripping jaws in fact must normally have wide surfaces of contact with the bars, so as to be able to withstand the considerable forces involved in this phase of the casting and rolling process. The jaws must grip the ends of the bars to be joined and cause an energetic action of pressure to maintain sufficient contact during welding, as well as to compensate for the defects of shape of the bars, since the end surfaces of these frequently do not have a perfectly regular shape or else the bars are twisted along their length. During their gripping action, the jaws are consequently subject to heavy loads which they can sustain only if they are built of adequate size. Furthermore, the bigger the jaws, the more they can compensate for the surface irregularities of the cast product. On the other hand, the larger the dimensions of the jaws, the more heat transferred from the cast product, which can no longer be recovered from the considerable residual heat of the bar itself; this affects the size of the black patches.

On the other hand, the black patches, which remain on the bars after the welding operation, are one of the factors which give rise to adverse effects on the rolling chain in which the bars subsequently pass. In fact, in the case where these cast products are made of conventional carbon steel, there is a lower temperature in the area of the black patches and hence a mechanical resistance higher than that of the rest of the cast product, where the temperature is instead higher. During passage of the bars between the rolls of the rolling mill, every transition from a high-temperature, and mechanically more malleable, area, to a lower-temperature, and less malleable, area, such as the one of the black patches, causes violent impact in the rolls of the rolling mill which, in the long run, causes early wearing-out of the rolling mill. The presence of such areas of black patches moreover requires additional operations or processes to correct such residual defects.

In the other case, instead, in which the bars are made of special steel alloy, the possible presence of temperature differences between various areas of the bar itself may also induce thermo-mechanical transformations in its metallurgical structure.

On the other hand, to overcome the problem of the presence of black patches, it is not possible to increase the working temperature of the gripping jaws, which are in general made of high-conductivity metallic alloy, of the type Cu, Cu—Be, Cu—Be—Ni, Cu—Be—Fe, Cu—W—Ni, Cu—W—Fe, etc., and hence cannot work at excessively high temperatures. Consequently, it is necessary to provide forced cooling systems in the aforesaid jaws to prevent the risk of their mechanical collapse. In addition to this, their function as suppliers of electric current for welding contributes to increasing their temperature, which instead must be kept around a value of 500° C. In this processing phase instead, the cast products have a relatively high temperature, which is approximately between 1000° C. and 1200° C. This fact, combined with a relatively long duration of contact between the jaws and the bars gives rise to black patches of excessive dimensions.

The aim of the present invention is thus to overcome the drawbacks referred to above presented by known welding devices.

SUMMARY OF THE INVENTION

A primary purpose of the present invention is that of overcoming the drawbacks referred to above by providing a method for butt welding and the corresponding welding device—in particular for welding products of continuous casting—which present high productivity and reliability, contained costs, as well as guaranteeing an optimal welding quality, so as to reduce the processes on the product before its access to the rolling line.

The particular purpose of the present invention is to provide a welding device which enables a significant reduction in the time of contact of the electric power supplies with the surface of the cast product to be welded.

A further purpose of the present invention is to reduce substantially the dimensions of the areas of contact of the jaws with the surface of the cast product so as to reduce the dimensions of the so-called black patches, enabling complete reabsorption by means of the residual heat of the cast product.

Another purpose of the present invention is that of providing different mechanical elements for separating the functions for gripping the cast products from those of transmission of electric current for welding, so as to use the most appropriate materials for the respective functions in the fabrication of each element.

A further purpose of the present invention is to provide a welding device which may be introduced easily, i.e., without major adaptations, in the existing casting lines and which does not occupy more space than that occupied by devices of a type known.

These purposes are achieved by a welding device, in particular for butt welding of elements of a basically elongated shape, such as bars, billets, blooms or slabs produced by continuous casting, which comprises means for simultaneous conveying of at least two said elements along a processing line, means for gripping said at least two elements, means for the supply of electricity designed to be set in contact with the surfaces of said at least two elements, for carrying out a welding operation, characterized in that said gripping means and said electric power supply means are provided with respective positioning and actuation means, controlled by an actuation device designed to actuate the aforesaid gripping means and the aforesaid means for supplying electricity independently of each other to be set in contact with the surfaces of said at least two elements.

Thanks to this arrangement, the mechanical function is separate from the electrical one, with an important gain as regards the functionality of the welding device, so that each part is optimized in relation to its main functions.

According to a further aspect of the invention, a method is provided for butt welding of elements of a basically elongated shape, such as bars, billets, blooms or slabs produced by continuous casting which comprises the following steps:

a) producing by means of continuous casting at least two elements of substantially elongated shape,
b) conveying the first of said two elements to a rolling plant with a first feed speed and along a pre-set direction,
c) conveying the second of said two elements at a second feed speed higher than the one of the first of said two elements and along said pre-set direction,
d) setting the respective facing ends of the said two elements in mutual contact,
e) blocking said two elements by means of gripping jaws, set in a first operating position, so as to form a fixed block,
f) setting electric power supplies in contact with the side surfaces of said two elements,
g) supplying said electric power supplies with current for a pre-set time, to carry out mutual welding of the head of the said two elements and join them permanently together, making a single substantially elongated element,
h) detachment of said electric power supplies from the said single substantially elongated element,
i) detaching the jaws, in a second operating position, from said single substantially elongated element.

Thanks to the above method, formation of black patches is prevented and a product ready for rolling operation of optimal quality is obtained.

BRIEF DESCRIPTION OF THE FIGURES

Further characteristics and advantages of the invention will be more evident from the detailed description of a preferred but not exclusive embodiment of a device for welding illustrated as a non-limiting example, with the aid of the attached drawings in which:

FIG. 3 is a schematic side view of the welding device of FIG. 1 in a third operating phase;

FIG. 4 is a schematic side view of the welding device of FIG. 1 in a fourth operating phase;

FIG. 5 is a schematic side view of the welding device of FIG. 1 in a fifth operating phase;

FIG. 6 is a schematic side view of the welding device of FIG. 1 in a sixth operating phase.

DETAILED DESCRIPTION OF A PREFERRED EMBODIMENT OF THE INVENTION

Figure 1:
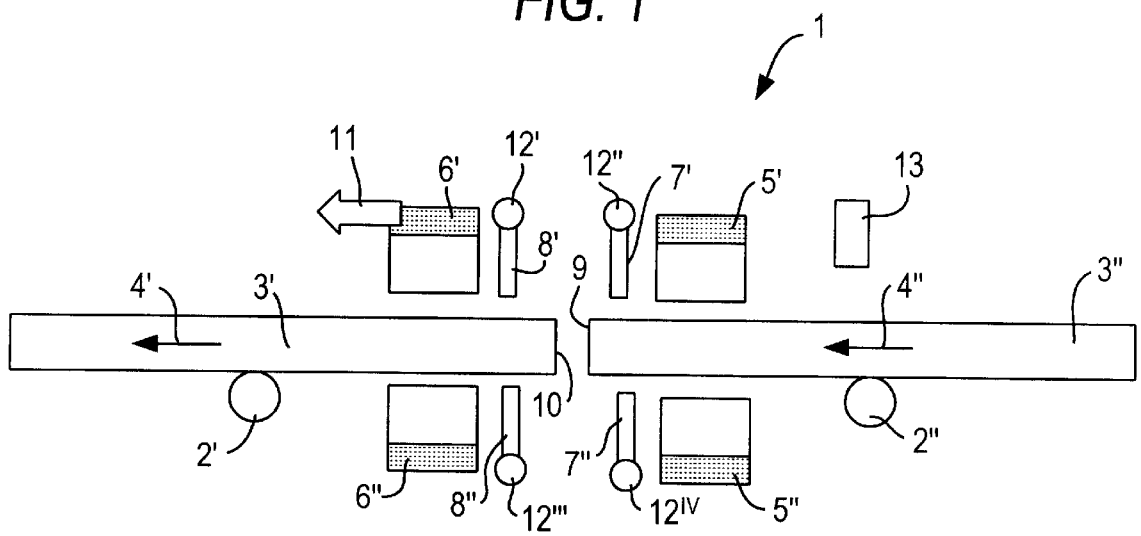
FIG. 1 is a schematic side view of a stretch of a casting and rolling line in which a welding device according to the invention is included.

With reference to the above figures, a welding device according to the invention, globally designated by reference numeral 1, inserted between a continuous casting plant and a rolling plant, comprises a system for conveying cast products, for example a roller conveyor, represented schematically by the rolls 2', 2". The elements conveyed may be bars 3', 3', billets or other products of similar shape, for example blooms or slabs. In the following description reference will be made to bars, where included in the term "bars" are also billets, blooms or slabs.

These bars come directly from a continuous-casting plant or else from a pre-heating furnace, both of types known and not represented in the drawings, and are fed in the direction indicated by the arrows 4', 4". The bar 3" is fed initially at a speed higher than that of the bar 3' which precedes it, until their facing ends 9, 10 are in contact, after which they move solidarity at the same speed.

The bar 3', which is generally made up of one or more bars joined together previously by means of butt welding, and at relatively high temperatures, i.e., higher than 1000° C., is transported by the roller conveyor in a rolling plant, of a known type and again not illustrated in the figures. The bar 3' can also have a considerable length following upon the joining of a number of bars together. To this bar 3' are welded the bars 3" necessary for obtaining a final product of a preset length.

The welding device 1 comprises two gripping jaws, made up of at least two gripping elements, of which the first 5', 5" is designed for gripping and positioning the bar 3", coming from the continuous-casting plant, from a furnace or else from a store. The second jaw 6', 6" is designed for gripping and positioning the bar 3' that has already entered the rolling mill.

The welding device further comprises two pairs 7', 7" and 8', 8" of electric power supplies for supplying electric current to the bars 3', 3", which are to be butt welded. In a phase prior to welding, the bars are sheared for a stretch, which is generally short, so as to make the two surfaces of ends 9, 10 perfectly plan and so as to optimize the surface of mutual contact.

In order to enable the electric power supplies 7', 7" and 8', 8" to adhere properly to the side surfaces of the bars also in points where there may be surface irregularities, installation is envisaged of the electric supplies on articulated joints $12^I$, $12^{II}$, $12^{III}$, $12^{IV}$, or on equivalent devices. In this way the current losses caused by the presence of irregular contacts between the ends of the electric power supplies and the surface of the bars are reduced.

The welding device 1 moreover comprises a bar-position sensor 13, for example of an optical photocell type, which sends a signal to the automated casting and rolling chain control system, by means of which the bar 3" is detected and set in a position of contact that is appropriate for the welding operation.

The phase represented in FIG. 1 refers in particular to the operation of bringing the bar 3" up to the bar of indefinite length 3'.

In a known way, the jaws 5', 5" and the welding electric power supplies 7', 7" and 8', 8" are set on a carriage or equivalent mobile supporting element, not represented in the Figure, which is displaced in the direction of the arrow 11 along a stretch upstream of the rolling line. In this way the welding operation is carried out simultaneously with the movement of feeding of the bars, with consequent saving of time.

Figure 2:
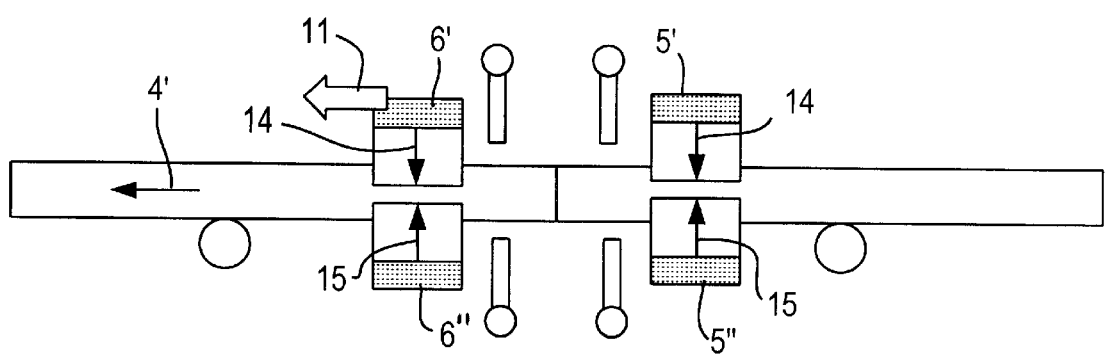
FIG. 2 is a schematic side view of the welding device of FIG. 1 in a second operating phase.

With reference to FIG. 2, a second phase of the welding process is represented in which the bars are set in a position of mutual contact at one of the surfaces 9, 10, and the jaws 5', 5", 6', 6" are closed, being displaced along the directions indicated by the arrows 14, 15. The two bars 3', 3" thus form a fixed block held firm by the gripping jaws.

We now pass on to the phase represented by FIG. 3, in which the electric power supplies are brought up to the respective bars, being moved according to the arrows 16, 17, whilst the jaws 5', 5" force the bar 3" in the direction of the arrows 18 to optimize the contact between the welding-head surfaces 9 and 10.

The current is then made to pass in the electric power supplies 7', 7", 8', 8" for a few seconds so as to enable butt welding of the two bars 3', 3".

In the course of the following phase, represented by FIGS. 4 and 5, the electric power supplies 7', 7", 8', 8" are moved away from the new bar 3''', transformed into a single piece by joining of the previous bars 3'and 3", along the directions indicated by the arrows 19, 20. The jaws 5', 5", 6', 6" continue to grip the bar 3'''so as to enable use of appropriate tools for cutting or removal of material 21, 23 for trimming the welding area 22.

In all the steps represented in FIGS. 2–5, the welding device carries out a translational movement in the direction of the arrow 11.

At the end of the latter operation, the jaws are released by displacing them in the direction of the arrows 24, 25. The bar 3''' is thus now free and advances in the direction of the arrows 4', whilst the set of jaws 5', 5", 6', 6" is moved away fixedly in the opposite direction indicated by the arrow 26 so as to set themselves in an area for joining up with the next bar.

In the device according to the invention, the gripping jaws 5', 5", 6', 6" are made of steel, or else of a nickel-based or cobalt-based alloy. They do not require cooling because they are resistant to temperatures like the temperature of the bars in this phase. In this way, the cause of production of the black patches is eliminated to a large extent. Advantageously, a thick layer of insulating material, such as mica, may be inserted between the surface of the jaws and the machine to reduce the dimensions of the black patches even further. It is also possible to shield the outer surfaces of the jaws thermally and, if necessary, it is also possible to provide an internal system for heating the jaws.

The electric power supplies may be sized according to criteria linked to electrical conductivity, which means that the surface of contact with the bar is less than ¹/₁₀ of the dimensions of the jaws of the prior art. Appropriately these electric power supplies may also be provided with a forced cooling system, since the duration of the contact with the bars does not exceed three seconds. During the rest of the period in which the bars are kept gripped by the jaws, the electric power supplies are detached from their surface. The modalities of operation of the system for cooling the electric power supplies may be regulated according to the type of material to be welded and to the welding sequence to be carried out, for example normal cooling cannot be done when the supplies are in a retracted position and break off cooling when they are in contact with the bars. It is possible to carry out this cooling sequence in the case where electric power supplies are used made of any material among those listed previously. It is possible to carry out this welding without the cooling sequence in the case where supplies made of tungsten are used.

The electric power supplies $7^I$, $7^{II}$, $8^I$, $8^{II}$ of the welding device according to the present invention do not have mechanical functions, and hence the only force to be applied on them is the one sufficient to produce an optimal electrical contact with the bars. Hence, also the articulated joint $12^I$, $12^{II}$, $12^{III}$, $12^{IV}$ can be made with contained dimensions, albeit ensuring optimal positioning and contact of the electric power supplies with the surface of the bars.

In the device according to the invention, the welding time and the sequence of the operations remain the same as for the known welding device described in the premise.

The proposed device thus affords a series of important advantages:

- the same space occupied by the casting and rolling chain and the compactness of the welding device,
- times of contact between the electric power supplies and the cast products reduced to the minimum,
- reduction and, in certain cases, total elimination of the black patches,
- elimination of the black patches makes it possible to use the welding device both with rolling mills non-reinforced rolls for conventional steels, and for rolling mills designed for special alloy steels,
- the welding device can be installed on existing plants, with consequent improvement in productivity, in the plant-utilization factor, in product quality and in management of the casting and rolling plants,
- no modifications are required in the existing electrical equipment of plants already built,
- maintenance of the casting and rolling plants is facilitated since it is easy to replace the electric power supplies subject to a faster wear than to replace the jaws.
- absence of black patches favors a longer service life of the rolling plants, with reduction in the need for maintenance, i.e., duration and frequency of maintenance interventions.

What is claimed is:

1. A welding apparatus for electric welding together metallic members at an elevated temperature, the apparatus comprising:
   a.) conveying means for the simultaneous conveyance along a predetermined path of at least two members to be welded;
   b.) gripping means for gripping the at least two members, wherein contact between the gripping means and the at least two members is minimized so as to minimize heat loss from the members to the gripping means;
   c.) first positioning means for positioning the gripping means;
   d.) first actuation means for actuating the gripping means, wherein said first positioning means and said first actuation means associated with said gripping means operate such that the at least two members gripped by the gripping means are positioned and maintained in contact with one another during the welding operation thereof;
   e.) electric power supply means separate from the gripping means;
   f.) second positioning means for positioning the electric power supply means;
   g.) second actuation means for actuating the electric power supply means, wherein said second positioning means and said second actuation means associated with the electric power supply means operate such that said electric power supply means are brought in contact with the at least two members and supplied with electric current thereto for electric welding together thereof during conveyance of the members; and
   h.) a controller for controlling, independently of one another, operation of the gripping means, the first positioning means for positioning the gripping means, and the first actuation means for actuating the gripping means and the electric power supply means, with the second positioning means for positioning the electric power supply means, and the second actuation means for actuating the electric power supply means.

2. The apparatus according to claim 1, wherein the gripping means includes at least one gripping jaw for each member being welded.

3. The apparatus according to claim 1, further comprising:
   heating means for heating the gripping means, wherein the gripping means are heated to minimize heat loss from the members being welded, at an elevated temperature, when the gripping means are in contact therewith.

4. The apparatus according to claim 3, wherein the gripping means are heated to the same temperature as the temperature of the members being welded.

5. The apparatus according to claim 3, wherein the gripping means includes:
   an outer surface having a thermally insulated portion located where the outer surface does not come in contact with the members being welded.

6. The apparatus according to claim 1, wherein the electric power supply means are articulated to enable electrical contact between the electric power supply means and the members being welded to be maintained during welding.

7. The apparatus according to claim 6, wherein the electric power supply means includes a forced cooling device for cooling the electric power supply means.

8. The apparatus according to claim 1, wherein the electrical power supply means are in contact with the at least two members to be welded only at such times as electric current flows to the electric power supply means and welding is performed.

9. The apparatus according to claim 1, wherein the gripping means and the electric power supply means move together with the members being welded.

10. The apparatus according to claim 1, further comprising:
    cutting means, positioned upstream of the conveying means and gripping means, for cutting a smooth planar surface into a member to be welded at a place on a surface thereof that is to abut another member to which the member is to be welded;
    a scaling device, positioned upstream of the conveying means and gripping means, for cleaning outer surfaces of members to be welded; and
    trimming means, positioned downstream of the electric power supply means, for removing irregularities on a surface of the weld between welded members.

11. The apparatus according to claim 1, further comprising at least one member position sensor for detecting a position of any of the at least two members along the predetermined conveyance path.

12. The apparatus according to claim 11, wherein the member position sensor is an optical photocell.

13. The apparatus according to claim 1, wherein the conveying means has a variable conveyance speed.

14. The apparatus according to claim 13, wherein conveyance speeds of the at least two members to be welded are independently variable.

15. The apparatus according to claim 14, wherein a second member is conveyed at a speed greater than a speed at which a first member is conveyed, such that the second member is positioned in contact with the first member to which the second member is to be welded, with a surface of the second member abutting a surface of the first member at which a weld is to be made.

16. The apparatus according to claim 1, wherein the gripping means are made from a material selected from the group consisting of steel, nickel-based alloy, and cobalt-based alloy.

17. The apparatus according to claim 1, wherein the electric power supply means performs electric welding of metallic members that are produced by continuous molten casting.

18. The apparatus according to claim 1, wherein the electric power supply means performs butt-welding of metallic members that are produced by continuous molten casting, wherein the welding occurs between continuous casting and rolling of the members.

19. The apparatus according to claim 1, wherein the predetermined path of conveyance of the at least two members is a segment of a member processing line, which is positioned for welding of the members to occur between a step of continuous casting of the members to be welded and a step of rolling of the welded members.

20. A method for electric welding, at an elevated temperature, metallic members produced by continuous molten casting, the welding occurring between the continuous casting and rolling of the members, the method comprising the steps of:
    a.) providing at least two members to be welded to one another;
    b.) conveying a first of the at least two members along a predetermined path at a first speed;

c.) conveying a second of the at least two members along the predetermined path at a second speed greater than the first speed;

d.) abutting the first and second members at respective contact surfaces of each member at which they are to be welded;

e.) blocking the abutting members in contact with one another at their respective contact surfaces utilizing gripping means to grip each member;

f.) providing electric power supply means separate from the gripping means to contact each abutting member proximal to the respective contact surfaces at which they are to be welded;

g.) providing an electric current to the electric power supply means for a predetermined period of time to butt-weld the two members at their contact surfaces to form a welded member;

h.) stopping the flow of electric current to the electric power supply means;

i.) removing the electric power supply means from contact with the welded member;

j.) removing the gripping means from the welded member; and k.) repeating steps a–j, as required, for any subsequent members to be joined, wherein the first member in step k is the welded member of step g of the previous sequence and the second member is a new member to be welded thereto.

* * * * *